(12) United States Patent
Carter et al.

(10) Patent No.: US 8,979,383 B2
(45) Date of Patent: Mar. 17, 2015

(54) DYNAMICALLY-LUBRICATED BEARING AND METHOD OF DYNAMICALLY LUBRICATING A BEARING

(75) Inventors: Bruce Alan Carter, West Chester, OH (US); Pradeep Hemant Sangli, Bangalore (IN); Santosh Kumar Potnuru, Bangalore (IN); Laxmikant Chourasia, Bangalore (IN)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 13/269,686

(22) Filed: Oct. 10, 2011

(65) Prior Publication Data

US 2013/0087413 A1    Apr. 11, 2013

(51) Int. Cl.
*F16C 19/00* (2006.01)
*F16C 33/66* (2006.01)
*F16C 33/38* (2006.01)
*F16C 33/58* (2006.01)

(52) U.S. Cl.
CPC ......... *F16C 33/6681* (2013.01); *F16C 33/6677* (2013.01); *F16C 33/3843* (2013.01); *F16C 33/3887* (2013.01); *F16C 33/583* (2013.01); *F16C 2360/23* (2013.01)
USPC ............................ 384/470; 384/465; 384/475

(58) Field of Classification Search
CPC ............. F16C 33/6681; F16C 33/6614; F16C 33/6651; F16C 33/6629; F16C 33/6685
USPC ........................... 384/470, 472, 473, 474, 475
See application file for complete search history.

(56) References Cited

U.S. PATENT DOCUMENTS

| | | | | |
|---|---|---|---|---|
| 3,179,478 A | * | 4/1965 | Readdy | 384/472 |
| 3,195,965 A | | 7/1965 | Van Dorn | |
| 3,350,147 A | * | 10/1967 | Hingley | 384/472 |
| 3,722,967 A | | 3/1973 | Lewis | |
| 4,192,560 A | * | 3/1980 | Hartnett | 384/572 |
| 4,334,720 A | | 6/1982 | Signer | |

(Continued)

FOREIGN PATENT DOCUMENTS

| | | |
|---|---|---|
| DE | 102010055090 A1 | 8/2011 |
| EP | 1850020 A1 | 10/2007 |
| WO | 9605412 A1 | 2/1996 |

OTHER PUBLICATIONS

Search Report and Written Opinion from corresponding International Application No. PCT/US2012/054967, dated Nov. 22, 2012.

*Primary Examiner* — Marcus Charles
*Assistant Examiner* — Yamilka Pinero Medina
(74) *Attorney, Agent, or Firm* — General Electric Company; Pamela A. Kachur

(57) ABSTRACT

Dynamically-lubricated bearings and methods of dynamically lubricating bearings, including bearings used in gas turbine engines. Such a bearing includes an inner race having an inner race groove, an outer race having an outer race groove that opposes the inner race groove, rolling elements disposed between the inner and outer races and in rolling contact with the inner and outer race grooves, and a cage disposed between the inner and outer races to maintain separation between the rolling elements. A lubricant is introduced into a cavity between the inner and outer races, and rotation of the inner race relative to the outer race causes air to enter pockets of the cage that contain the rolling elements, which in turn causes the lubricant to exit the cavity of the bearing.

8 Claims, 7 Drawing Sheets

(56) References Cited

U.S. PATENT DOCUMENTS

| | | | |
|---|---|---|---|
| 5,575,733 A * | 11/1996 | Machida et al. ............... 476/40 |
| 5,749,660 A | 5/1998 | Dusserre-Telmon et al. |
| 6,261,003 B1 | 7/2001 | Dusserre-Telmon |
| 6,478,467 B1 * | 11/2002 | Graber ............................. 384/51 |
| 7,059,776 B2 * | 6/2006 | Kobayashi et al. ........... 384/470 |
| 7,267,488 B2 * | 9/2007 | Azumi et al. ................. 384/474 |
| 7,458,723 B2 * | 12/2008 | Menges ........................... 384/51 |
| 7,507,028 B2 * | 3/2009 | Markle ......................... 384/523 |
| 2002/0126927 A1 * | 9/2002 | Compassi ..................... 384/470 |
| 2003/0068110 A1 * | 4/2003 | Matsui et al. ................. 384/572 |
| 2004/0032998 A1 * | 2/2004 | Iwata et al. ................... 384/513 |
| 2006/0120646 A1 * | 6/2006 | Suzuki ......................... 384/470 |
| 2010/0290728 A1 * | 11/2010 | Solfrank et al. .............. 384/470 |
| 2011/0002568 A1 * | 1/2011 | Kawamura et al. ........... 384/470 |
| 2012/0033907 A1 * | 2/2012 | Huhnke et al. ............... 384/473 |
| 2013/0051717 A1 * | 2/2013 | Duffy et al. .................. 384/470 |

\* cited by examiner

Bearing Aft Axial Load

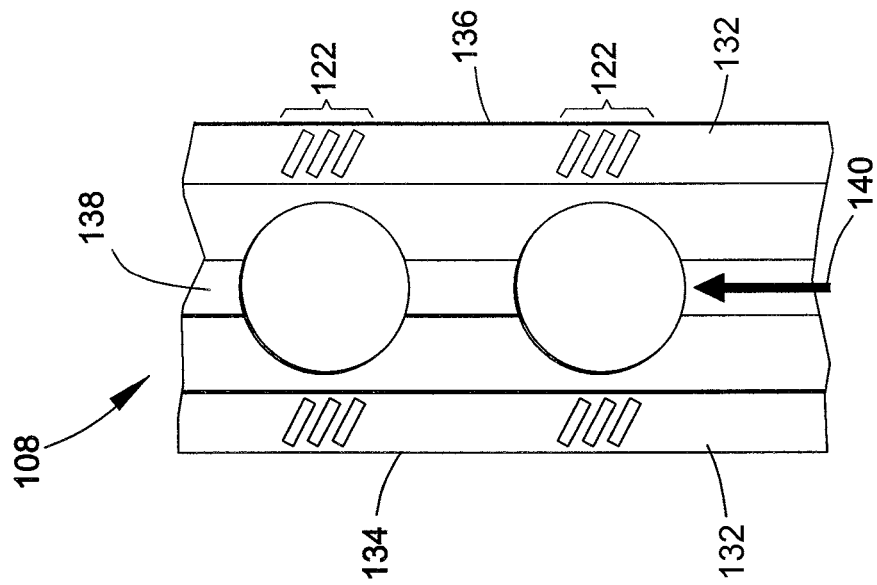
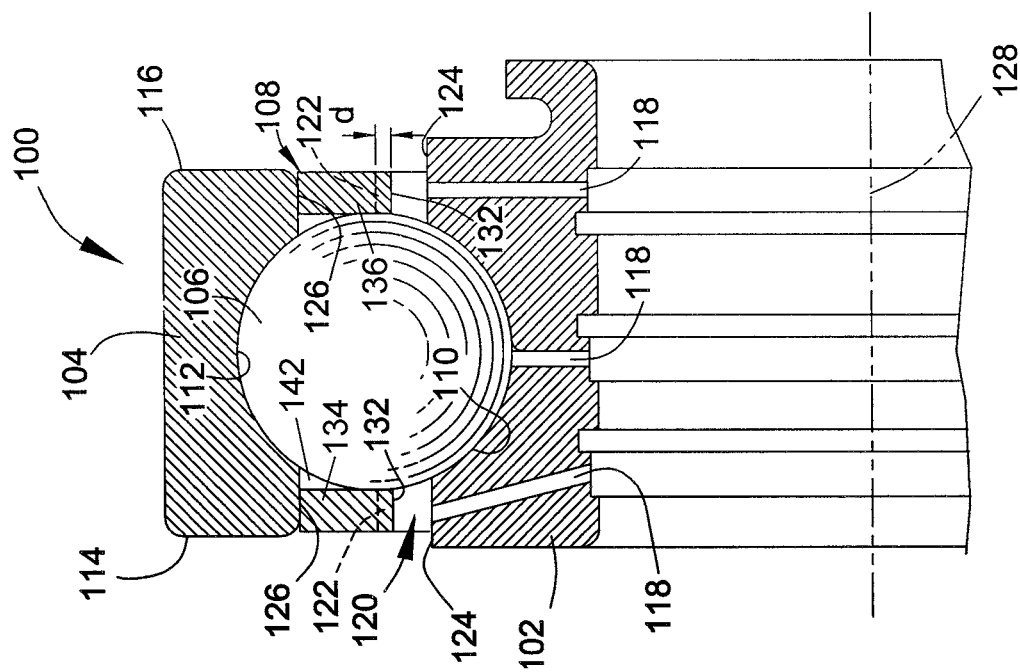

DYNAMICALLY-LUBRICATED BEARING AND METHOD OF DYNAMICALLY LUBRICATING A BEARING

BACKGROUND OF THE INVENTION

The present invention generally relates to bearings and more particularly to bearings of the type that are dynamically lubricated, wherein the bearings are configured to inhibit viscous heating of the lubricant and thereby operate at relatively lower temperatures.

FIG. 1 schematically represents a high-bypass turbofan engine 10 of a type known in the art. The engine 10 is schematically represented as including a nacelle 12 and a core engine module 14. A fan assembly 16 located in front of the core module 14 includes an array of fan blades 18. The core module 14 is represented as including a high-pressure compressor 22, a combustor 24, a high-pressure turbine 26 and a low-pressure turbine 28. Air is drawn into the inlet duct 20 of the engine 10 and then compressed by the compressor 22 before being delivered to the combustor 24, where the compressed air is mixed with fuel and ignited to produce hot combustion gases that pass through the turbines 26 and 28 before being exhausted through a primary exhaust nozzle 30. To generate additional engine thrust, a large portion of the air that enters the fan assembly 16 is bypassed through an annular-shaped bypass duct 32 before exiting through a fan exit nozzle 34.

FIG. 1 schematically represents the high-pressure compressor 22 and high-pressure turbine 26 as mounted on the same shaft 36 so that the flow of hot exhaust gases that pass through the high-pressure turbine 26 turns the turbine 26 as well as the compressor 22 via the shaft 36. The shaft 36 is supported with multiple rolling element bearings, of which a ball bearing 38 is represented in FIG. 1 located near the entrance of the compressor 22. The shaft 36 is mounted within an inner race of the bearing 38, while an outer race of the bearing 38 is supported by a static structure of the core engine module 14. From FIG. 1, it should be apparent that the axis of the bearing 38 coincides with the centerline 35 of the engine 10.

FIG. 2 represents a cross-sectional view of a portion of the bearing 38 of FIG. 1. As a ball bearing, the bearing 38 is shown as comprising an inner race 40, an outer race 42, rolling elements (balls) 44 (of which only one is shown in FIG. 2), and a cage 46. The rolling elements 44 reside within grooves 50 and 52 defined in opposing surfaces of the races 40 and 42, respectively, such that in combination the grooves 50 and 52 define the load-bearing contact surfaces of the bearing 38. The cage 46 serves to maintain separation between the rolling elements 44. In FIG. 2, each groove 50 and 52 is represented as having a semi-spherical cross-sectional shape that closely matches the curvature of the rolling elements 44, though with a slightly larger radius than the rolling element 44. Such a shape is commonly referred to as a circular arch, and provides a single contact point between each rolling element and each individual race 40 and 42. The contact points or patches 54 and 56 are diametrically opposed as schematically represented in FIG. 2. The term "patches" refers to the fact that a true point contact does not exist when a bearing is loaded, and that the contact patches 54 and 56 have elliptical shapes caused by loading between the rolling elements 44 and the races 40 and 42.

Due to the high rotational speeds required of the shaft 36, the bearing 38 must operate at high rotational speeds. Specifically, though the outer race 42 does not rotate, the inner race 40 rotates at the same speed as the shaft 36 and the rolling elements 44 therebetween rotate around the inner race 42 at a lower speed than the inner race 42. High-speed ball bearings of the type represented in FIG. 1 are often dynamically cooled with a lubricant that flows through the bearing 38. In FIG. 2, the inner race 40 of the bearing 38 is provided with under-race lubrication features in the form of multiple inlets 48 through which a lubricant (typically oil) is introduced into an annular-shaped cavity 58 defined by and between the inner and outer races 40 and 42 of the bearing 38. The lubricant provides both lubrication and cooling of the rolling elements 44 and cage 46 within the cavity 58. Under the influence of centrifugal forces caused by the spinning inner race 40, the lubricant supplied through the inlets 48 flows radially outward to contact the cage 46, the rolling elements 44, and the outer race 42. As represented in FIG. 2, because the bearing 38 is provided with an under-race lubrication system, the cage 46 is typically configured so that it bears against cage lands 60 on the inner race 40.

Because the outer race 42 does not rotate and the inner race 40, rolling elements 44 and cage 46 are moving at different speeds, the lubricant within the cavity 58 tends to churn, which as used herein refers to nonhomogeneous flow patterns within the cavity 58. Analysis has shown that churning primarily occurs at the outer race 42, and more particularly within the groove 52 of the outer race 42, where the lubricant tends to accumulate before exiting the bearing 38. Analysis has also indicated that churning occurs between the cage 46 and inner race 40, as a result of a low pressure area created by the rotational effects of the high-speed rolling elements 44. In conventional dynamically-lubricated bearing designs, the lubricant exits the bearing 38 at the inner and outer diameters of the cage 46 on both axial ends 62 and 64 of the bearing 38, with the majority of the lubricant exiting at the outer diameter of the cage 46 in view of the position of the cage 46 against the inner race cage lands 60. Furthermore, when the bearing 38 is operating with an axial load (as represented in FIG. 2), a majority of the lubricant will exit at the outer diameter of the cage 46 and on the unloaded side of the bearing 38.

Various approaches have been proposed to promote the lubrication of rolling element bearings, including efforts to reduce heat generation at high rotational speeds. One such approach disclosed in U.S. Pat. No. 5,749,660 to Dusserre-Telmon et al. is the inclusion of a drain feature in the outer race. The drain features are orifices having entrances that are located in the groove of the outer race and exits that are located on the outer circumference of the outer race, so that the lubricant drains from the bearing by flowing completely through the outer race in a radially outward direction. The grooves of the inner and outer races do not have circular cross-sectional shapes matching the curvature of the rolling elements, but instead are described as having rather conical shapes that define vertices which form part of a central circumference of each groove. As a result, the rolling elements never cover the drain orifices located in the outer race groove, but instead touch the outer race at two lateral contact patches on each side of the orifices. Such a configuration is similar to conventional bearing races that have what is commonly referred to as a gothic arch, in which case the race is defined by two radii with different axes of curvature, as opposed to the aforementioned circular arch defined by a single radius. Similarly, the rolling elements contact the inner race groove at two lateral contact patches on each side of inlet orifices that are formed in the inner race to introduce the lubricant into the bearing, with the result that each rolling element can have as few as two and as many as four contact points with the inner and outer races.

While not intending to promote any particular interpretation of U.S. Pat. No. 5,749,660, it appears that the four-point contact may not be capable of operating with a low axial load conditions that would occur when the rotor thrust load changes direction during transitions from low to high speed conditions, as would be required in most gas turbine applications of the type represented in FIG. 1. Furthermore, the drain orifices may contribute significant stress concentrations in the outer race and reduce the ability of the bearing to survive ultra-high load events, such as fan blade out conditions.

BRIEF DESCRIPTION OF THE INVENTION

The present invention provides dynamically-lubricated bearings and to methods of dynamically lubricating bearings, including bearings of the type suitable for use in gas turbine engines.

According to a first aspect of the invention, a dynamically-lubricated bearing includes an inner race having an inner race groove between a pair of inner race cage lands, an outer race circumscribing the inner race and having an outer race groove that is between a pair of outer race cage lands and opposes the inner race groove, rolling elements disposed between the inner and outer races and in rolling contact with the inner and outer race grooves, and a cage disposed between the inner and outer races to maintain separation between the rolling elements. The cage comprises side rails and spacers therebetween that, in combination, define pockets in which each of the rolling elements is individually received. The side rails define a pair of outer diametrical surfaces of the cage that face the outer race cage lands of the cage and an oppositely-disposed pair of inner diametrical surfaces of the cage that face the inner race cage lands of the cage. The bearing is configured for introducing a lubricant into the cavity between the inner and outer races, and features are provided in the cage for enabling air to ingress into the pockets by fluidically interconnecting the pockets to an external environment surrounding at least one of a pair of axial ends of the bearing.

Another aspect of the invention is a method of dynamically lubricating a bearing that comprises the elements described above. The method includes installing the bearing in a gas turbine engine so as to support a shaft that interconnects a compressor and a turbine of the gas turbine engine. A lubricant is introduced into the cavity between the inner and outer races, and the inner race is rotated relative to the outer race so that air enters into the pockets of the cage through the features and causes the lubricant to exit the cavity of the bearing.

Another aspect of the invention is a method of dynamically lubricating a bearing that comprises an inner race having an inner race groove between a pair of inner race cage lands, an outer race that has an outer race groove that is between a pair of outer race cage lands and opposes the inner race groove, rolling elements disposed between the inner and outer races and in rolling contact with the inner and outer race grooves, and a cage disposed between the inner and outer races to maintain separation between the rolling elements. The cage includes side rails and spacers therebetween that, in combination, define pockets in which each of the rolling elements is individually received. The side rails define a pair of outer diametrical surfaces of the cage that face the outer race cage lands of the outer race and an oppositely-disposed pair of inner diametrical surfaces of the cage that face the inner race cage lands of the inner race. The method includes introducing a lubricant into a cavity between the inner and outer races, and then rotating the inner race relative to the outer race so that air enters the pockets of the cage through features defined in at least one of the side rails, the outer diametrical surfaces, and the inner diametrical surfaces of the cage. The air causes the lubricant to exit the cavity of the bearing.

A technical effect of the invention is the ability to reduce heat generation within bearings that are dynamically lubricated and operate at high rotational speeds. The reduction in heat generation is achieved with the use of air to purge lubricant from regions within the bearing that are prone to lubricant churning, such as the pockets of the cage, while providing a robust construction that is capable of withstanding ultra-high load events and thrust load crossovers, as would be required in many gas turbine applications.

Other aspects and advantages of this invention will be better appreciated from the following detailed description.

BRIEF DESCRIPTION OF THE DRAWINGS

FIG. 6 is a fragmentary cross-sectional view of a rolling element bearing having a cage that incorporates flow features in its inner diametrical surface in accordance with embodiments of the present invention.

FIG. 7 is a view of a rolling element bearing having a cage that incorporates flow features in its inner diametrical surfaces in accordance with an embodiment of the present invention.

DETAILED DESCRIPTION OF THE INVENTION

Figure 3:
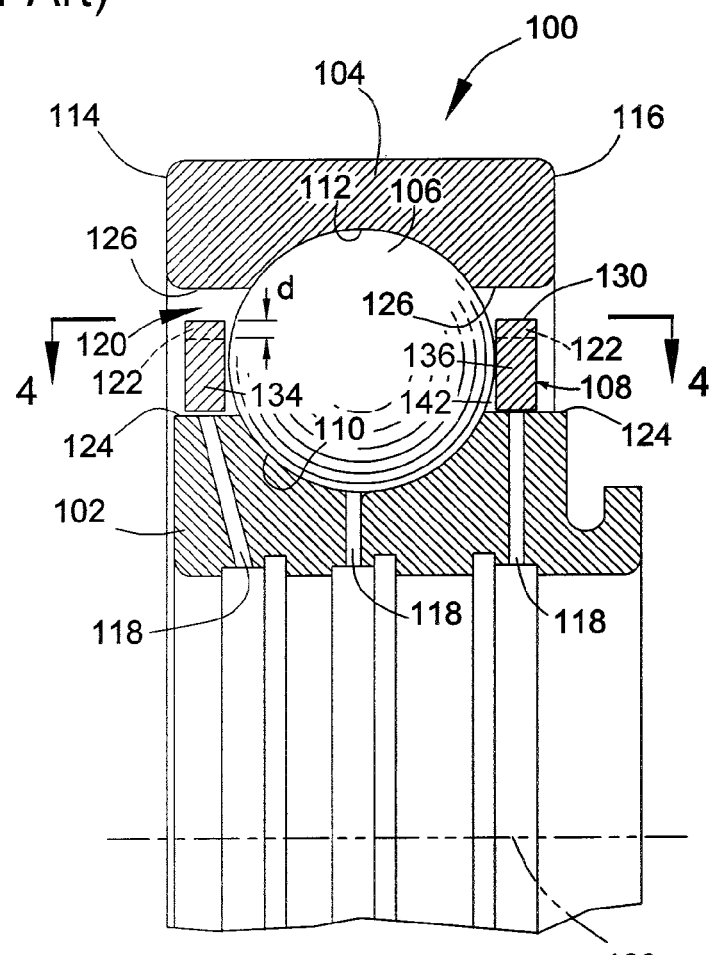
FIG. 3 is a fragmentary cross-sectional view of a rolling element bearing having a cage that incorporates flow features in its outer diametrical surfaces in accordance with embodiments of the present invention.

FIG. 3 schematically represents a rolling element bearing 100 for the purpose of describing aspects of the present invention. It should be noted that the drawings are drawn for purposes of clarity when viewed in combination with the following description, and therefore are not necessarily to scale. To facilitate the description of the bearing 100 provided below, the terms "vertical," "horizontal," "lateral," "front," "rear," "side," "forward," "rearward," "upper," "lower," "above," "below," "right," "left," etc., may be used in reference to the perspective of the orientation of the bearing 10 in FIG. 3, and therefore are relative terms and should not be otherwise interpreted as limitations to the construction, installation and use of the bearing 100.

Figure 2:
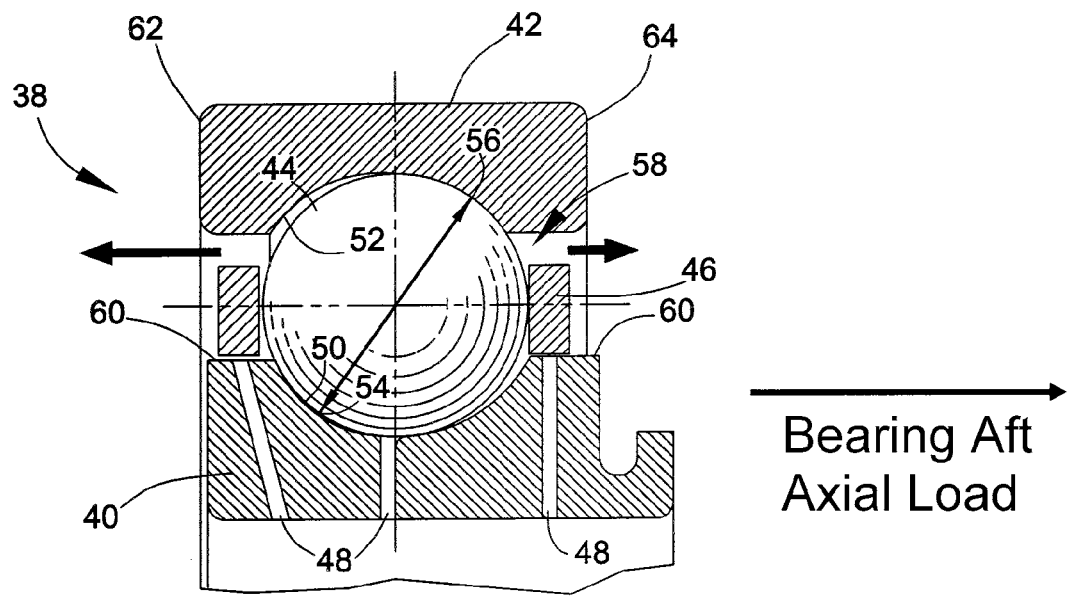
FIG. 2 is a fragmentary cross-sectional view of a rolling element bearing of a type known in the art.

As represented in FIG. 3, the bearing 100 has a similar construction to that of the bearing represented in FIG. 2. As such, the bearing 100 is represented as a ball bearing that comprises an inner race 102, an outer race 104 that circumscribes the inner race 102, rolling elements (balls) 106 (of which only one is shown in FIG. 3) between the inner and outer races 102 and 104, and a cage 108 that serves to maintain separation between the rolling elements 106. For this purpose, the cage 108 comprises side rails 134 and 136 and spacers 138 therebetween that, in combination, define pockets 142 in which each rolling element 106 is individually received. Each adjacent pair of rolling elements 106 is separated by one of the spacers 138.

Each of the inner race 102, outer race 104 and cage 106 has an annular shape, as is typical for rolling element bearings. The rolling elements 106 reside within grooves 110 and 112 defined in opposing surfaces of the races 102 and 104, respectively. Each groove 110 and 112 is axially disposed between a pair of cage lands 124 and 126, respectively, defined on their corresponding inner or outer race 102 and 104. In combination, the grooves 110 and 112 define the load-bearing contact surfaces of the bearing 38. As with conventional ball bearings, the grooves 110 and 112 may have semi-spherical cross-sectional shapes that closely match the curvature of the rolling elements 106 to provide two or more contact patches between each rolling element 106 and the races 102 and 104, as was described in reference to FIG. 2. In particular, either or both of the inner and outer races 102 and 104 may have a traditional gothic arch shape or a traditional circular arch shape (according to the previously-noted definitions for these terms). In preferred embodiments of the invention, the inner race 102 has a gothic arch shape and the outer race 104 has a circular arch shape.

Figure 1:
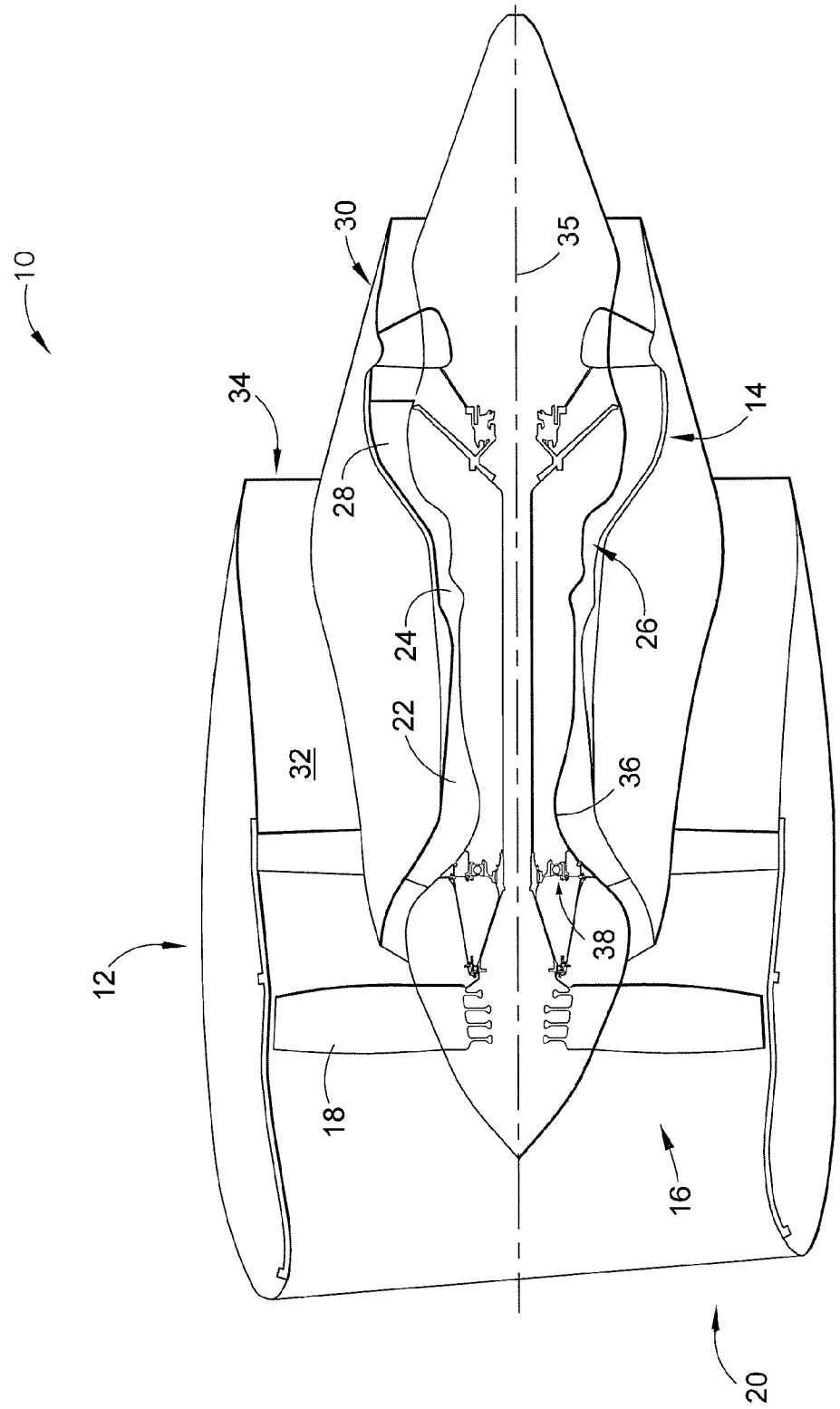
FIG. 1 schematically represents a cross-sectional view of a high-bypass turbofan engine.

The bearing 100 can be adapted for use in high-speed rotational applications, including mounting of the shaft 36 of FIG. 1. As previously described, typically in such applications the outer race 104 does not rotate, the inner race 102 rotates at the same speed as the shaft 36, and the rolling elements 106 rotate around the inner race 102 at a lower speed than the inner race 102. Also similar to the bearing 38 represented in FIG. 2, the bearing 100 is configured to be dynamically cooled with a lubricant that enters the bearing 100 through inlet orifices 118 located in the inner race 102, providing what may be referred to as an under-race lubrication system. With these orifices 118, the bearing 100 is provided with a lubrication capability in which a lubricant (typically oil) is introduced into an annular-shaped cavity 120 defined by and between the inner and outer races 102 and 104 of the bearing 100 to provide both lubrication and cooling of the rolling elements 106 and cage 108. Under the influence of centrifugal forces induced by the spinning inner race 102, the lubricant supplied through the orifices 118 flows radially outward to contact the cage 108, the rolling elements 106, and the outer race 104. FIG. 3 represents a preferred configuration in which three orifices 118 are present. With this approach, a relatively high percentage of the total lubricant flow can be caused to flow through the center orifice 118 to feed the rolling elements 106, while a smaller percentage of the total lubricant flow is delivered to each of the two remaining orifices 118 to lubricate the cage lands 124. Since the lubricant tends to centrifuge radially outward, a benefit of this configuration is that lubricant is provided directly to the cage lands 124, especially during critical operating phases such as start up and shut down when cage rubs are likely to occur.

Figure 4:
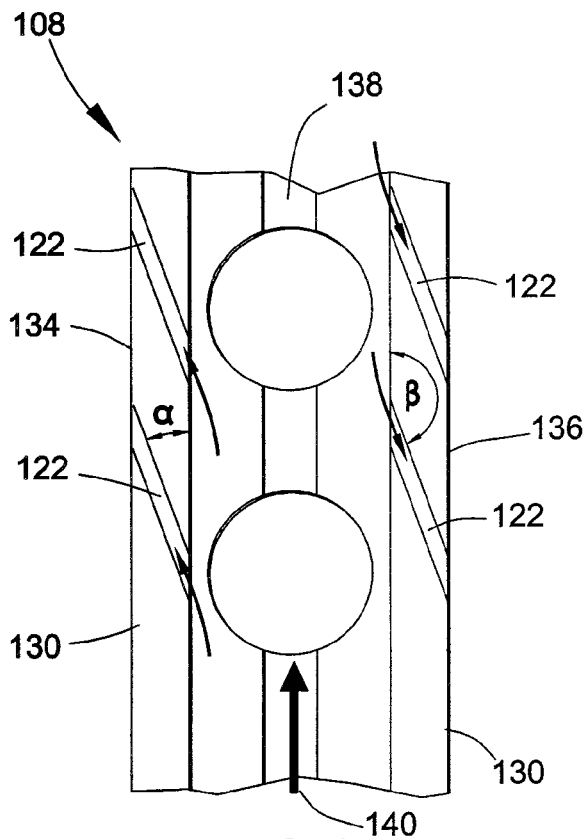
FIGS. 4 and 5 are views taken along line A-A of FIG. 3, and represent the flow features in the form of slots in accordance with two embodiments of the present invention.
Figure 5:
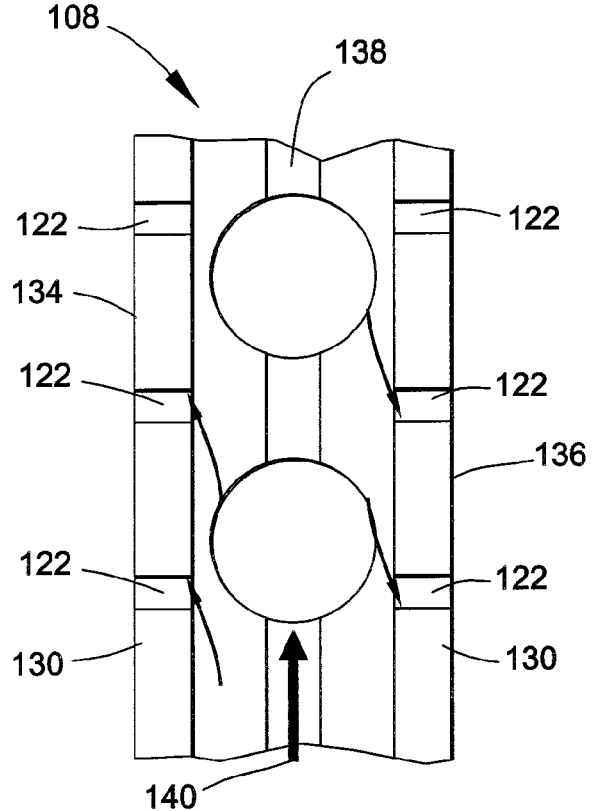

Because the outer race 104 does not rotate and the inner race 102, rolling elements 106 and cage 108 rotate at different speeds, the lubricant within the cavity 120 would ordinarily tend to churn. Churning tends to occur within the groove 112 of the outer race 104 where the lubricant accumulates before exiting the bearing 100, as well as that part of each cage pocket 142 between the cage 108 and inner race 102 due to a low pressure area created by the rotational effects of the rolling elements 106. To alleviate churning within this low pressure area, the cage 108 is provided with features 122 that dynamically promote the ingress of air into the cage pockets 142, which in turn is capable of promoting the flow of lubricant through the bearing cavity 120, including the outflow of lubricant at the inner and outer diameters of the cage 108 at both axial ends 114 and 116 of the bearing 100. In FIG. 3, the features 122 are represented as surface features 122 defined in each of a pair of outer diametrical surfaces 130 of the cage 108 defined by the side rails 134 and 136 of the cage 108, opposite a corresponding pair of inner diametrical surfaces 132 (FIG. 6) that are also defined by the side rails 134 and 136 and bear against the cage lands 124 of the inner race 102. Two embodiments of the surface features 122 are represented in FIGS. 4 and 5 as continuous channels or passages that entirely extend across their corresponding outer diametrical surfaces 130. As a result, each surface feature 122 defines a continuous channel or passage that is recessed below the surrounding surface of one of the outer diametrical surfaces 130, and fluidically interconnects the cage pockets 142 to the external environment surrounding one of the axial ends 114 and 116 of the bearing 100. The surface features 122 promote the ingress of air into the aforementioned low pressure area created within the cage pockets 142 by the rotational effects of the rolling elements 106, which relieves the low pressure condition to promote the flow of lubricant throughout the bearing cavity 120 as well as egress of the lubricant from the cage pockets 142 to the surrounding environment. In this manner, the invention is capable of reducing the viscous heat generation that would otherwise occur due to churning of the lubricant within the bearing cavity 120.

As evident from FIGS. 4 and 5, the surface features 122 are angled relative to the direction of rotation or travel 140 of the cage 108 and its rolling elements 106. In FIG. 4, the surface features 122 are also angled relative to the axis 128 of the bearing 100 (FIG. 3), which coincides with the engine centerline 35 (FIG. 1), whereas in FIG. 5 the surface features 122 are parallel to the bearing axis 128. As surface features 122 defined in the outer diametrical surfaces 130 of the cage 108, the features 122 can be readily created by machining the outer diametrical surfaces 130 of the cage 108 using a variety of conventional machining equipment.

The number, depth, width, and orientation of the features 122 relative to the travel direction 140 of the rolling elements 106 can be readily tailored to promote the ability of air to enter the cage pockets 142 and reduce the degree of churning that occurs prior to the lubricant exiting the bearing 100. Preferred numbers, depths and widths of the features 122 will depend in part on the size (diameter and axial length) of the bearing 100, the properties of the lubricant, and the desired flow rate of the lubricant through the bearing 100. For the application represented in FIG. 1, suitable depths (d in FIG. 3) for the features 122 are believed to be about 0.03 inch (about 0.75 mm) below the surrounding surfaces of the outer diametrical surfaces 130 of the cage 108, though lesser and greater depths are foreseeable. The width (w in FIG. 4) of each feature 122 is preferably greater than its depth, with suitable widths believed to be about 0.12 to about 0.13 inch (about 3 to 3.3 mm), though lesser and greater widths are foreseeable. To provide an adequate airflow capacity and reduce localized churning of the lubricant within the cage pockets 142, it is believed that at least one feature 122 should be provided for each rolling element 106 to promote a more efficient removal of lubricant from the outer race groove 112. Certain other geometrical considerations are believed to exist, including the desirability for the features 122 to have flat sidewalls to promote the capture of lubricant from the bearing cavity 120.

In FIG. 4, the features 122 are represented as straight channels that are oriented so as to be inclined at an acute angle, α, or at an obtuse angle, β, to the direction 140 that the rolling elements 106 travel with the cage 108. The features 122 represented in FIG. 4 are inclined at an acute angle (α) of about thirty degrees or an obtuse angle (β) of about 150 degrees to the travel direction 140 of the rolling elements 106, though it is believed that other acute and obtuse angles can be used. FIG. 5 represents another embodiment of the invention in which both sets of features 122 are disposed approximately perpendicular to the travel direction 140 of the rolling elements 106. Though within the scope of the invention, models have indicated that the configuration represented in FIG. 5 would not be as effective as that of FIG. 4. The features 122 are represented in FIGS. 4 and 5 as straight, though it is foreseeable that the features 122 could be formed to have an arcuate shape. A potential benefit of curved features 122 would be that the capture angle for the lubricant could be more shallow (less than 30 degrees), and a curved shape could allow more features 122 to be accommodated within an available space. Furthermore, it is foreseeable that the features 122 on either or both outer diametrical surfaces 130 could differ from each other, for example, the features 122 could differ from each other in terms of their shape, width, depth and orientation.

The features 122 are capable of promoting the flow of lubricant from the bearing cavity 120, and therefore reduce heat generation within the bearing 100 by reducing churning of the lubricant within the regions of the cage pockets 142 adjacent the inner race 102. By reducing the heat generation within the bearing 100, the invention further has the capability of reducing the capacity of the lubrication system coolers that would otherwise be required to cool the bearings of a gas turbine engine. In turn, reducing the size of the coolers reduces the weight and performance losses of the engine and consequently improves the fuel consumption for the engine and aircraft.

The surface features 122 depicted in FIGS. 4 and 5 are also believed to provide advantages over prior attempts to reduce heat generation within dynamically-lubricated bearings of the type represented in FIG. 2. One advantage is that the features 122 are limited to the outer diametrical surfaces 130 of the cage 108, which are nonfunctional surfaces of bearings equipped with an under-race lubrication system as a result of the cage 108 bearing against the cage lands 124 of the inner race 102 (as represented for the bearings 38 and 100 of FIGS. 2 and 3). By avoiding the use of drain orifices that pass entirely through the outer race 104 (as done in U.S. Pat. No. 5,749,660), the invention avoids any loss in structural integrity that would occur as a result of stress concentrations associated with through-holes in the outer race 104. As such, it is believe that the bearing 100 would be more capable of surviving ultra-high load events, such as fan blade out conditions.

Because the features 122 are not located within the outer race groove 112, the invention also avoids any concern for damage occurring to the rolling elements 106 as a result of contact with the features 122. This advantage is in contrast to U.S. Pat. No. 5,749,660, whose race grooves must each be machined to have a conical shape so that the inlet and drain orifices formed in the race grooves never come into contact with the rolling elements. Consequently, the invention can make use of an inner groove 110 having a gothic arch shape, while the outer groove 112 may have a circular arch shape that more closely matches the curvature of the rolling elements 106. As a result, depending on the loading conditions, contact between each rolling element 106 and the races 102 and 104 may occur at two locations that are diametrically opposed (similar to what is schematically represented in FIG. 2), or at two locations to one side of the element 106, or at more than two locations. It is believed that, in contrast to the bearing of U.S. Pat. No. 5,749,660, the bearing 100 described above is likely to be more capable of operating with a thrust load crossover, as is typically required in gas turbine applications of the type represented in FIG. 1.

The invention can also be adapted to bearings that do not utilize under-race lubrication. For example, for bearings that are supplied a lubricant through a side jet directed at the cavity 120, the cage 108 could be configured to bear against the outer race cage lands 126, as represented in FIG. 6. In this case, the features 122 can be formed in the inner diametrical surfaces 132 of the cage 108 in the same manner as described above for the features 122 formed in the outer diametrical surfaces 130 of the cage 108, in which case air ingress into the cage pockets 142 is promoted along the inner diametrical surfaces 132.

FIG. 7 represents another alternative for the surface features 122, in which the surface features 122 are not continuous channels or passages that entirely extend across their corresponding inner diametrical surfaces 132, but instead only partially extend across the inner diametrical surfaces 132. The surface features 122 of FIG. 7 have a different effect than the surface features 122 of FIGS. 4 and 5, in that the features 122 of FIG. 7 are intended to reduce the amount of lubricant that flows into the cage pockets 142 from the inlet orifices 118 located in the inner race 102. While not wishing to be limited to any particular theory, it is believed surface features 122 defined in the inner diametrical surfaces 132 of the cage 108 are capable of behaving as impellers that help to pump the lubricant out of the cage pockets 142. The features 122 also reduce the contact area between the inner diametrical surfaces 132 and the inner race 102.

Figure 8:
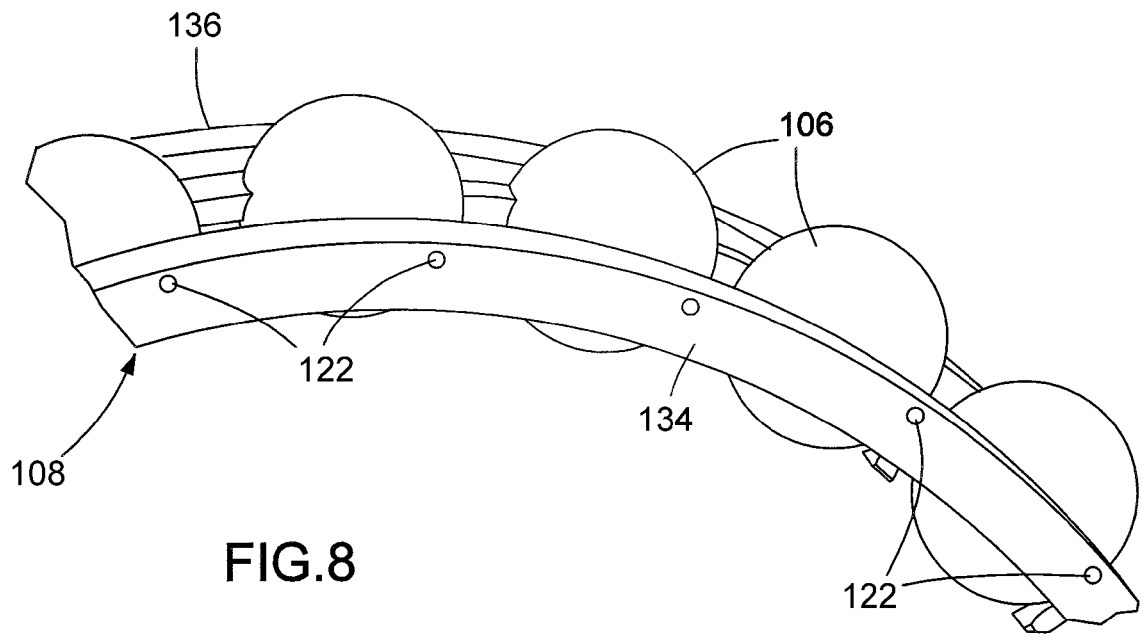
FIGS. 8 and 9 represent two fragmentary views of a cage of a rolling element bearing, in which the cage incorporates flow features in the form of through-holes in accordance with another embodiment of the present invention.
Figure 9:
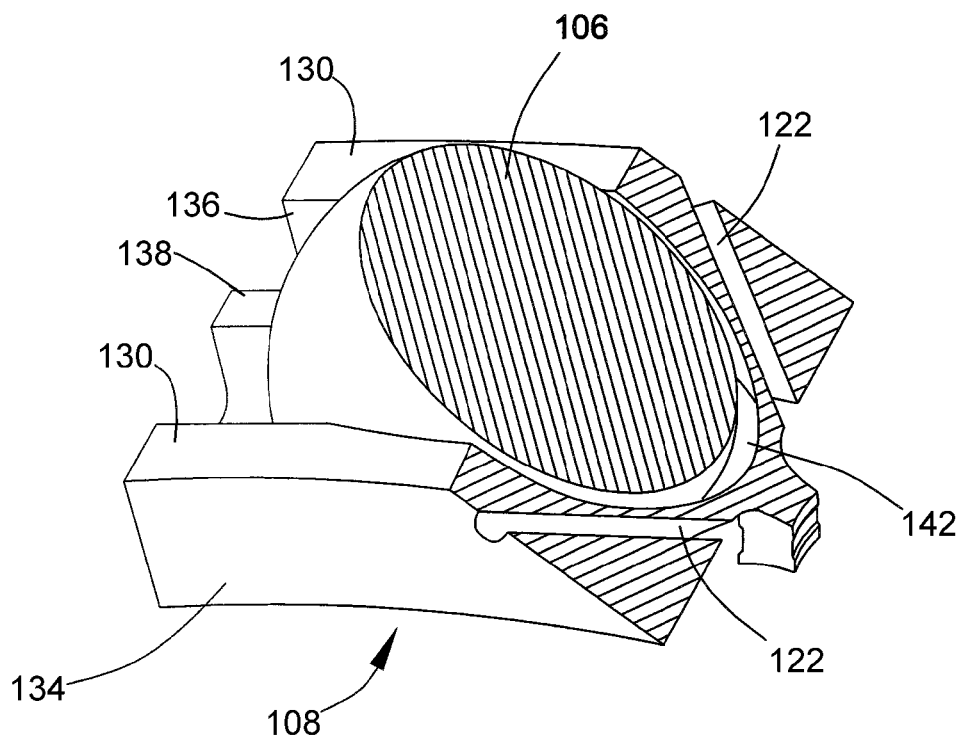
Figure 10:
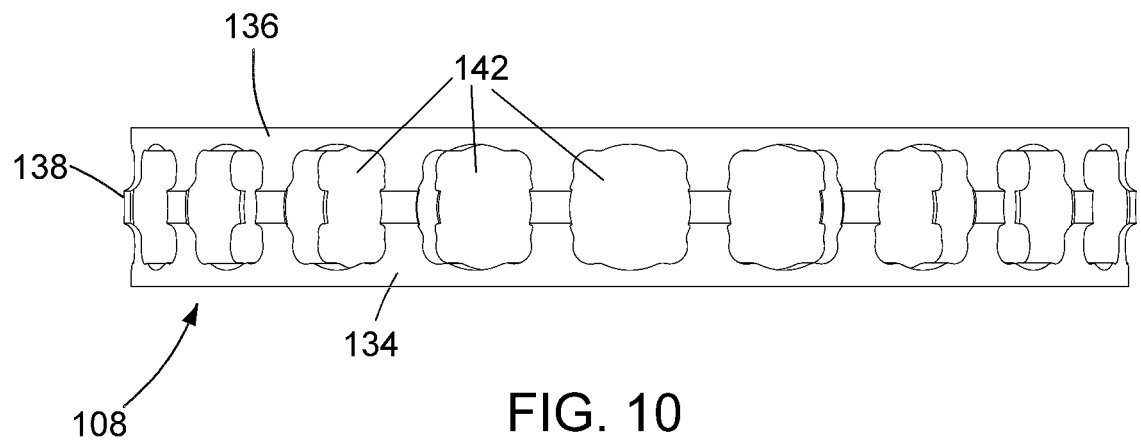
FIGS. 10 and 11 represent a side view and a detailed fragmentary view, respectively, of a cage that incorporates additional flow features in the corners of its pockets in accordance with still another embodiment of the present invention.
Figure 11:
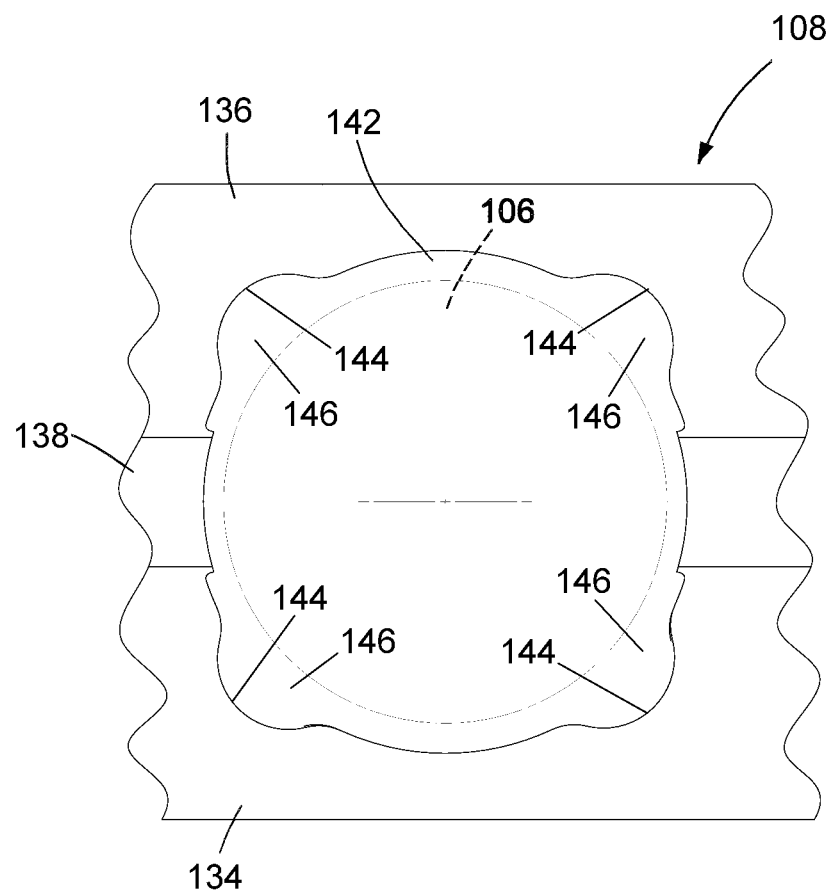
Figure 12:
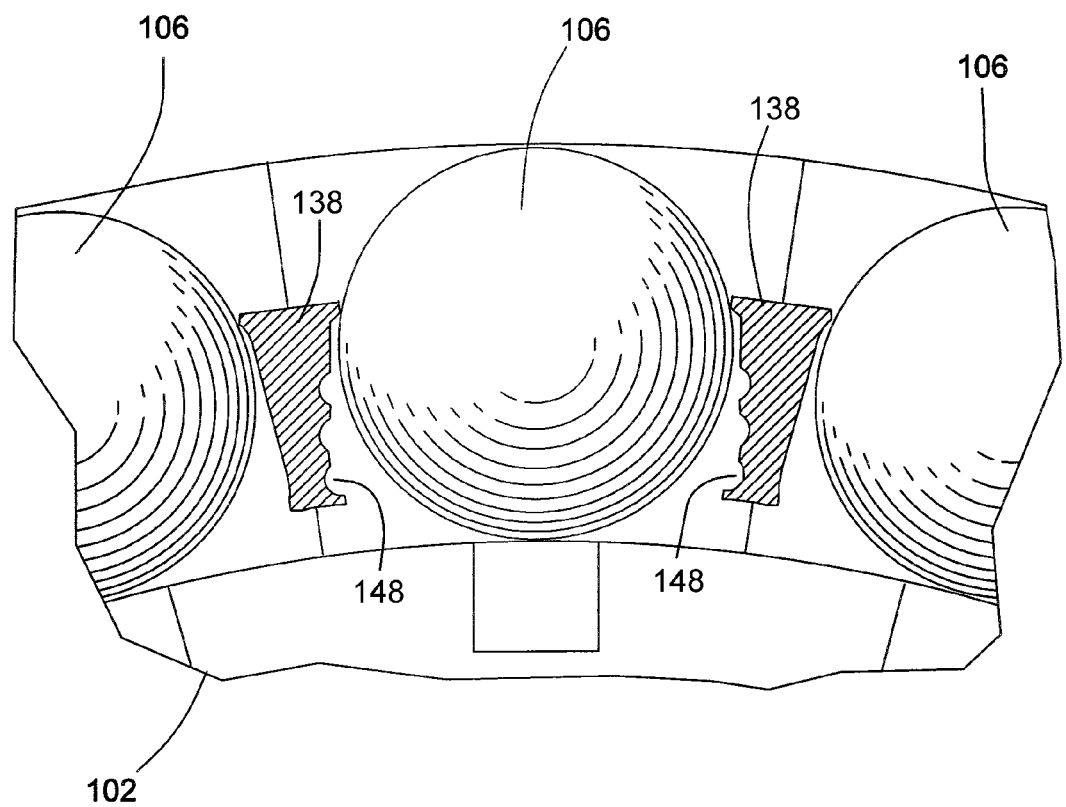
FIG. 12 represents a side view of a cage that incorporates flow features in the form of dimples on spacer surfaces of the cage in accordance with yet another embodiment of the present invention.

FIGS. 8 and 9 represent still another alternative for the features 122 that are capable of dynamically promoting the ingress of air into the cage pockets 142. The features 122 of FIGS. 8 and 9 differ from those of FIGS. 3 through 7, in that the former are through-holes defined in the cage 108, and specifically in the side rails 134 and 136 of the cage 108 that separate the rolling elements 106 from the axial ends of the cage 108. The through-hole features 122 of FIGS. 8 and 9 allow air to ingress to the inner diameter of the cage 108, which promotes the flow of lubricant from the inner diameter of the cage 108 to its outer diametrical surfaces 130 and then beyond to the external environment surrounding the axial ends 114 and 116 of the bearing 100. As such, the through-hole features 122 promote the ingress of air into the aforementioned low pressure area created within the cage pockets 142 by the rotational effects of the rolling elements 106. FIGS. 10 and 11 represent additional features for promoting the flow of lubricant radially outward through the cage 108. The features are in the form of recesses 144 located in each corner of the cage pocket 142, creating passages 146 through which the lubricant can flow around each rolling element 106 (shown in phantom in FIG. 11).

By relieving the low pressure condition, the flow of lubricant throughout the bearing cavity 120 is promoted, as well as egress of the lubricant from the cage pockets 142 to the surrounding environment. As evident from FIGS. 8 and 9, the through-hole features 122 can be formed as straight channels that are oriented so as to be inclined at an acute angle to the direction 140 that the rolling elements 106 travel with the cage 108. Due to limitations of space and stress, the through-hole features 122 will typically be limited to diameters of less than 0.1 inch (about 2.5 mm), for example, about 0.075 to about 0.085 inch (about 1.9 to about 2.1 mm), though it is foreseeable that larger features 122 could be formed to further enhance lubricant flow through the cage 108 and reduce heat generation. Similar to the surface features of FIGS. 3 through 7, it is believed that the through-hole features 122 of FIGS. 8 and 9 can be provided in numbers roughly equal to the number of rolling elements 106 held by the cage 108 to provide an adequate airflow capacity and reduce localized churning of the lubricant within the cage pockets 142.

Finally, FIG. 10 represents an additional aspect of the invention by which bearing performance can be promoted by increasing the lubricant turbulence adjacent the cage spacers 138 in order to reduce drag forces attributable to rotation of the rolling elements 106 within the cage pockets 142. In particular, the surfaces of the spacers 138 facing the rolling elements 106 are dimpled with numerous recesses 148, similar to the surface of a golf ball. Semispherical recesses 148 are believed to be satisfactory, though it is foreseeable that recesses 148 of a variety of shapes and sizes could be used. Notably, this aspect of the invention can be used independently or in combination with any of the embodiments described in reference to FIGS. 3 through 9.

From the above, it should be appreciated that the bearings 100 described above are well suited for installation in a variety of applications, in addition to gas turbine engines. Generally, any of the bearings 100 can be installed so that the rotation of its rolling elements 106 results in the elements 106 circumferentially traveling between the inner and outer races 102 and 104 while contacting their respective grooves 110 and 112. A lubricant injected or otherwise delivered into the cavity 120 is then drawn through the cavity 120, more particularly from the cage pockets 142, as a result of the features 122 promoting ingress of air into the cage pockets 142, which in turn promotes the expulsion of lubricant from the cage pockets 142 and the bearing cavity 120. As such, the lubricant is not drained from the bearing cavity 120 through the outer race 104, but instead is drawn from the cavity 120 between the cage lands 124 and 126 and the cage 108 therebetween.

While the invention has been described in terms of specific embodiments, it is apparent that other forms could be adopted by one skilled in the art. For example, the physical configuration of the bearing 100 could differ from that shown, and various materials and processes could be used to construct and fabricate the bearing 100. Therefore, the scope of the invention is to be limited only by the following claims.

The invention claimed is:

1. A dynamically-lubricated bearing comprising:
a rotating inner race having an inner race groove between a pair of inner race cage lands;
an outer race that does not rotate and circumscribes the inner race so as to define an annular-shaped cavity therebetween, the outer race having an outer race groove that is between a pair of outer race cage lands and opposes the inner race groove;
rolling elements disposed between the inner and outer races and in rolling contact with the inner and outer race grooves;
a cage disposed between the inner and outer races to maintain separation between the rolling elements, the cage comprising side rails and spacers therebetween that, in combination, define pockets in which each of the rolling elements is individually received, the side rails defining a pair of outer diametrical surfaces of the cage that face the outer race cage lands of the outer race and an oppositely-disposed pair of inner diametrical surfaces of the cage that face the inner race cage lands of the inner race;
means for introducing a lubricant into the cavity between the inner and outer races; and
features in the cage for enabling air to ingress into the pockets of the cage, wherein the features comprise through-hole features through at least one of the side rails of the cage, the through-hole features directly fluidically interconnecting the inner diametrical surfaces of the cage to an external environment surrounding at least one of a pair of axial ends of the bearing, wherein the features in the cage are configured so that air that is ingressed into the pockets thereby causes the lubricant to exit the cavity of the bearing,
wherein the through-hole features include a first opening in one of the side rails of the cage, at least a second opening in the inner diameter of the cage, and the first and second openings are directly fluidically interconnected by a passage therebetween.

2. The dynamically-lubricated bearing according to claim 1, wherein the through-hole features are oriented so as to be inclined at an acute angle to a direction that the rolling elements travel within the inner and outer race grooves.

3. The dynamically-lubricated bearing according to claim 1, wherein the through-hole features have diameters of less than 2.5 mm millimeters.

4. The dynamically-lubricated bearing according to claim 1, further comprising recesses defined in corners of the pockets of the cage, the recesses defining lubricant flow passages around the rolling elements within the pockets.

5. The dynamically-lubricated bearing according to claim 1, wherein the features correspond in number to the number of rolling elements.

6. The dynamically-lubricated bearing according to claim 1, wherein the lubricant introducing means comprises at least one orifice through the inner race.

7. The dynamically-lubricated bearing according to claim 1, wherein each adjacent pair of the rolling elements is separated by one of the spacers of the cage, and the cage comprises recessed dimples on surfaces of the spacers facing the rolling elements.

8. A method of dynamically lubricating the dynamically-lubricated bearing of claim 1, the method comprising:
installing the bearing in a gas turbine engine so as to support a shaft that interconnects a compressor and a turbine of the gas turbine engine;
introducing a lubricant into the cavity between the inner and outer races; and
rotating the inner race relative to the outer race so that air enters into the pockets of the cage through the features and causes the lubricant to exit the cavity of the bearing.

* * * * *

UNITED STATES PATENT AND TRADEMARK OFFICE
CERTIFICATE OF CORRECTION

PATENT NO. : 8,979,383 B2
APPLICATION NO. : 13/269686
DATED : March 17, 2015
INVENTOR(S) : Carter et al.

It is certified that error appears in the above-identified patent and that said Letters Patent is hereby corrected as shown below:

In the Specification

In Column 2, Line 1, delete "inner race 42" and insert -- inner race 40 --, therefor.

In Column 2, Line 2, delete "inner race 42." and insert -- inner race 40. --, therefor.

In Column 4, Line 60, delete "bearing 10" and insert -- bearing 100 --, therefor.

In Column 5, Line 10, delete "cage 106" and insert -- cage 108 --, therefor.

Signed and Sealed this
First Day of March, 2016

Michelle K. Lee
*Director of the United States Patent and Trademark Office*